US008975536B2

(12) United States Patent
Kuroda

(10) Patent No.: US 8,975,536 B2
(45) Date of Patent: Mar. 10, 2015

(54) WIRING STRUCTURE, DISPLAY PANEL, AND DISPLAY DEVICE

(75) Inventor: Tatsuro Kuroda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 182 days.

(21) Appl. No.: 13/695,955

(22) PCT Filed: Jan. 21, 2011

(86) PCT No.: PCT/JP2011/051065
§ 371 (c)(1),
(2), (4) Date: Nov. 2, 2012

(87) PCT Pub. No.: WO2011/142146
PCT Pub. Date: Nov. 17, 2011

(65) Prior Publication Data
US 2013/0048362 A1 Feb. 28, 2013

(30) Foreign Application Priority Data

May 14, 2010 (JP) ................. 2010-111802

(51) Int. Cl.
*H05F 3/00* (2006.01)
*H05K 1/18* (2006.01)
*G02F 1/1345* (2006.01)

(52) U.S. Cl.
CPC .................. *G02F 1/1345* (2013.01)
USPC ............ 174/260; 349/54; 349/139; 349/152; 349/192

(58) Field of Classification Search
CPC . H05K 1/0215; H05K 1/0216; H05K 1/0219; H05K 1/0259; H05K 1/0296; H05K 9/0079; H05K 7/06; G09G 3/293

USPC ............ 257/202; 345/173; 349/54, 139, 152; 200/512

See application file for complete search history.

(56) References Cited

U.S. PATENT DOCUMENTS

| 5,606,340 | A | 2/1997 | Suzuki et al. |
| 6,157,066 | A | 12/2000 | Kobayashi |
| 6,346,976 | B1 | 2/2002 | Komeno et al. |
| 6,680,759 | B2 * | 1/2004 | Ogawa ........................... 349/54 |
| 2004/0232447 | A1 * | 11/2004 | Crane et al. .................. 257/202 |
| 2005/0241853 | A1 * | 11/2005 | Aoki ............................. 174/261 |
| 2009/0091551 | A1 * | 4/2009 | Hotelling et al. ............. 345/174 |
| 2009/0091673 | A1 | 4/2009 | Chen et al. |
| 2009/0279038 | A1 * | 11/2009 | Shie .............................. 349/150 |

FOREIGN PATENT DOCUMENTS

| JP | 64-59321 A | 3/1989 |
| JP | 6-332011 A | 12/1994 |

(Continued)

*Primary Examiner* — Timothy Thompson
*Assistant Examiner* — Michael F McAllister
(74) *Attorney, Agent, or Firm* — Chen Yoshimura LLP

(57) ABSTRACT

Provided is a wiring structure that can prevent circuit elements from breaking due to static electricity. The disclosed wiring structure includes: a transparent substrate 11; wiring lines 14 that are formed on the transparent substrate 11; and dummy wiring lines 17 that are formed on the transparent substrate 11 and to which a static electricity absorbers 18 are connected. Prescribed sections of the dummy wiring lines 17 are provided closer to an outer edge 11a of the transparent substrate 11 than the wiring lines 14, and the prescribed sections of the dummy wiring lines 17 are shaped so as to extend towards the outer edge 11a side of the transparent substrate 11.

11 Claims, 9 Drawing Sheets

(56) References Cited

FOREIGN PATENT DOCUMENTS

| JP | 7-56191 A | 3/1995 |
| JP | 10-3087 A | 1/1998 |
| JP | 2000-155329 A | 6/2000 |
| JP | 2001-5018 A | 1/2001 |
| JP | 2008-275841 A | 11/2008 |
| JP | 2009-15320 A | 1/2009 |
| JP | 2009-205084 A | 9/2009 |

* cited by examiner

WIRING STRUCTURE, DISPLAY PANEL, AND DISPLAY DEVICE

TECHNICAL FIELD

The present invention relates to a wiring structure, a display panel, and a display device.

BACKGROUND ART

In a liquid crystal display device, which is a type of display device, a liquid crystal display panel (display panel) that displays images does not emit light, and therefore, a backlight unit is installed on the rear side (the side of the liquid crystal display panel opposite to the display side) of the liquid crystal display panel. The liquid crystal display device conducts display by illuminating the rear side of the liquid crystal display panel with backlight from the backlight unit.

The liquid crystal display panel has a structure in which liquid crystals are sealed between two transparent substrates (an active matrix substrate and an opposite substrate), and in the display region thereof, a plurality of pixels are arranged in a matrix form. Of the two transparent substrates, the active matrix substrate is provided with a terminal part that connects electrically to each pixel (a circuit element such as a switching element), and it is therefore possible to connect a prescribed circuit board to the terminal part (refer to Patent Document 1, for example).

Specifically, as shown in FIG. 13, in conventional devices, the external size of an active matrix substrate 101 is greater than that of an opposite substrate 102, allowing a part of the surface of the active matrix substrate 101 on the side of an outer edge 101a (hereinafter referred to as a terminal surface 101b) to be exposed when the active matrix substrate 101 and the opposite substrate 102 are bonded together. Wiring lines 103 are formed on the terminal surface 101b on the outer edge 101a side of the active matrix substrate 101, and tips 103a of the wiring lines 103 form a terminal part.

RELATED ART DOCUMENTS

Patent Documents

Patent Document 1: Japanese Patent Application Laid-Open Publication No. 2008-275841

SUMMARY OF THE INVENTION

Problems to be Solved by the Invention

The wiring lines 103 formed on the terminal surface 101b on the outer edge 101a side of the active matrix substrate 101 are normally arranged such that the tips 103a extend towards the outer edge 101a side of the active matrix substrate 101.

However, if the tips 103a of the wiring lines 103 extend towards the outer edge 101a side of the active matrix substrate 101, the tips 103a of the wiring lines 103 become susceptible to static electricity discharges. If this occurs, the circuit elements break due to static electricity because the wiring lines 103 are electrically connected to circuit elements such as switching elements.

The present invention was made in view of the above-mentioned problem and the object of the present invention is to provide a wiring structure, a display panel, and a display device that can mitigate the breakage of circuit elements due to static electricity.

Means for Solving the Problems

In order to accomplish the above-mentioned object, a wiring structure according to a first aspect of the present invention includes: a substrate on which a circuit element is installed; wiring lines that are formed on the substrate and transmit electric signals to the circuit element; and dummy wiring lines for countermeasures against static electricity that are formed on the substrate and that are not connected to the wiring lines, the dummy wiring lines being connected to static electricity absorbers, wherein locations where prescribed parts of the dummy wiring lines are disposed are closer to an outer edge side of the substrate than locations where the wiring lines are disposed, and the prescribed parts of the dummy wiring lines are formed in a shape that extends towards the outer edge side of the substrate.

In the first aspect, by using the above configuration, static electricity is more likely to be discharged to the prescribed parts of the dummy wiring lines, and the static electricity is thus absorbed by the static electricity absorber. With this configuration, discharges of static electricity to the wiring lines, which are electrically connected to the circuit elements, can be avoided. Thus, breakage of the circuit elements due to static electricity can be mitigated.

In the wiring structure according to the first aspect, it is preferable that a width of the dummy wiring lines be greater than a width of the wiring lines. With this configuration, the electrical resistance of the dummy wiring lines is reduced, which allows the static electricity absorber to absorb static electricity efficiently.

In the wiring structure according to the first aspect, it is preferable that tips of the dummy wiring lines and tips of the wiring lines be disposed in a region on the outer edge side of the substrate, and that the tips of the dummy wiring lines extend further towards the outer edge side of the substrate compared to the tips of the wiring lines. In other words, it is preferable that the above-mentioned prescribed parts of the dummy wiring lines be the tips of the dummy wiring lines. With this configuration, when the tips of the wiring lines connected electrically to the circuit elements are disposed in the region on the outer edge side of the substrate, static electricity is more likely to be discharged to the tips of the dummy wiring lines and not the tips of the wiring lines. Thus, breakage of the circuit elements due to static electricity can be mitigated with ease.

In a configuration in which the tips of the dummy wiring lines and the tips of the wiring lines are disposed in the region on the outer edge side of the substrate, it is preferable that the tips of the dummy wiring lines reach the outer edge of the substrate.

Also, in a configuration in which the tips of the dummy wiring lines and the tips of the wiring lines are disposed in the region on the outer edge side of the substrate, it is preferable that the wiring lines include a plurality of wiring lines and the tips of the plurality of wiring lines form a bundle, and that the tips of the dummy wiring lines extend further towards the outer edge side of the substrate than the bundle of the tips of the plurality of wiring lines. With this configuration, it is possible to avoid the discharge of static electricity to the tips of the plurality of wiring lines connected electrically to the circuit elements.

In this case, the bundle of the tips of the plurality of wiring lines may be sandwiched between the tips of the dummy wiring lines, or the tip of the dummy wiring line may extend towards the outer edge side of the substrate from the inside of the bundle of the tips of the plurality of wiring lines. With this configuration, it is possible to reliably avoid the discharge of static electricity to the tips of the plurality of wiring lines connected electrically to the circuit elements.

In the wiring structure according to the first aspect, a middle part of the dummy wiring line may extend along the outer edge of the substrate. With this configuration, the middle part of the dummy wiring line becomes susceptible to a discharge of static electricity and the discharge of static electricity to wiring lines that are electrically connected to the circuit elements is avoided.

In a configuration in which the middle part of the dummy wiring line extends along the outer edge of the substrate, it is preferable that a part of the middle part of the dummy wiring line juts out towards the outer edge side of the substrate.

A display panel according to a second aspect of the present invention includes the wiring structure according to the first aspect. With this configuration, it is possible to mitigate the breakage of circuit elements due to static electricity, thus improving the reliability and yield.

A display device according to a third aspect of the present invention includes the display panel according to the second aspect. With this configuration, it is possible to mitigate the breakage of circuit elements due to static electricity, thus improving the reliability and yield.

Effects of the Invention

As stated above, according to the present invention, it is possible to mitigate with ease the breakage of circuit elements due to static electricity.

DETAILED DESCRIPTION OF EMBODIMENTS (Embodiment 1)

First, an example is described in which a wiring structure of the present invention is applied to a large liquid crystal display device, which is a type of display device, with reference to FIGS. 1 to 4.

Figures 1, 2:
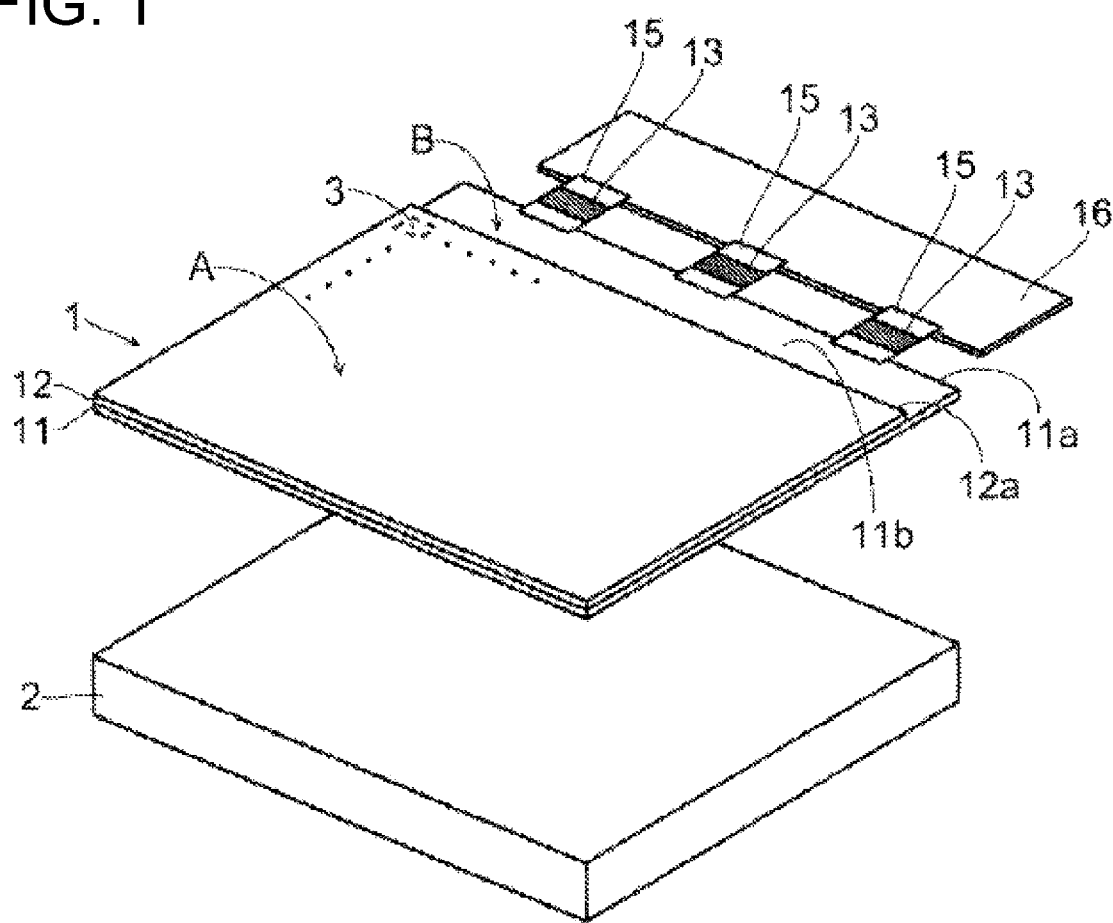
FIG. 1 is an exploded perspective view of a liquid crystal display device (display device) provided with a wiring structure according to Embodiment 1.
FIG. 2 is a circuit diagram of one pixel of the liquid crystal display device shown in FIG. 1.

As shown in FIG. 1, this large liquid crystal display device includes at least a liquid crystal display panel 1 and a backlight unit 2 provided on the rear side of the liquid crystal display panel 1, which is opposite to the display side. The liquid crystal display panel 1 is an example of a "display panel" of the present invention.

The liquid crystal display panel 1 has a display region A in which a desired image is actually displayed, and a non-display region B that is a region outside of the display region A. The display region A is provided with a plurality of pixels 3 arranged in a matrix form.

The respective plurality of pixels 3 have a circuit configuration shown in FIG. 2, and each pixel 3 has a switching element 3a, a pixel electrode 3b, a common electrode 3c, liquid crystals 3d, an auxiliary capacitor 3e, and the like. The circuit configuration of each pixel 3 shown in FIG. 2 is one example, and the circuit configuration is not limited thereto.

The switching element 3a is made of a TFT (thin film transistor), a gate thereof is connected to a gate line (scan line) GL, and a source thereof is connected to a source line (data line) SL. The drain of the switching element 3a is connected to the pixel electrode 3b, and the common electrode 3c is disposed opposite to the pixel electrode 3b. Liquid crystals 3d are interposed between the pixel electrode 3b and the common electrode 3c. The auxiliary capacitor 3e and the pixel electrode 3b are connected to the drain of the switching element 3a.

The switching element 3a, the pixel electrode 3b, the auxiliary capacitor 3e, the gate line GL, and the source line SL are formed on a transparent substrate 11 (refer to FIG. 1), which will be described below. The circuit that is constituted thereof corresponds to the "circuit element" in the present invention. The common electrode 3c is formed on a transparent substrate 12 (refer to FIG. 1), which will be described below.

The backlight unit 2 shown in FIG. 1 illuminates the rear side of the liquid crystal display panel 1, and the structure thereof is not limited to any type. The backlight unit 2 may be a direct type backlight device or an edge light backlight device. In addition, the light source for the backlight unit 2 may be a cold-cathode fluorescent lamp or a light emitting diode (LED).

When conducting display, optical properties (transmittance) of the liquid crystal display panel 1 are changed for each pixel 3, and the backlight from the backlight unit 2 illuminates the rear side of the liquid crystal display panel 1. As a result, a desired image is displayed on the display surface of the liquid crystal display panel 1.

The structure of the liquid crystal display panel 1 will be described in detail below.

Figure 3:
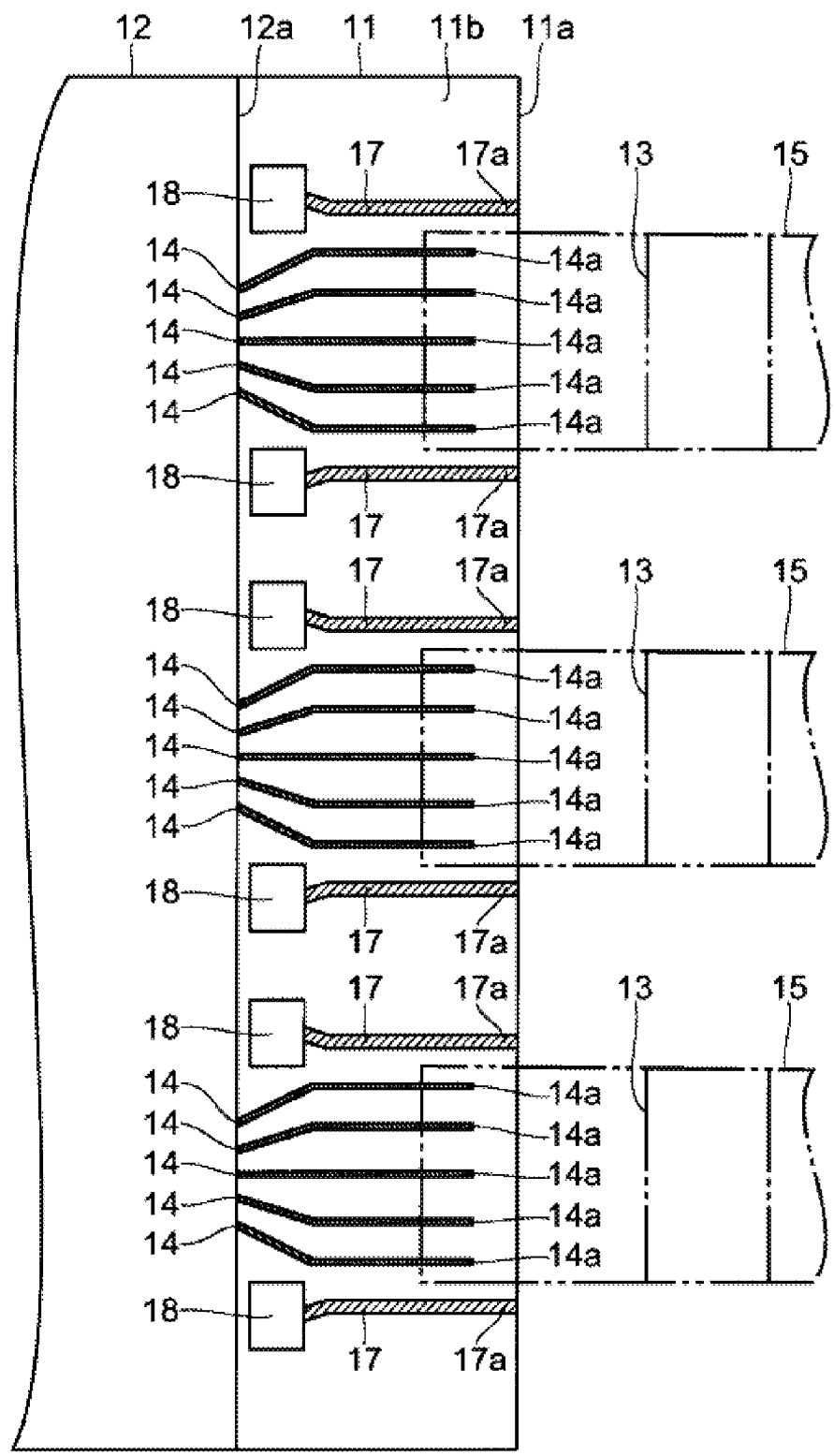
FIG. 3 is a plan view of a wiring structure according to Embodiment 1.

As shown in FIGS. 1 and 3, the liquid crystal display panel 1 includes at least two transparent substrates (a glass substrate or a plastic substrate, for example) 11 and 12. One transparent substrate 11 is the so-called active matrix substrate, and corresponds to the "substrate" in the present invention. On the transparent substrate 11, switching elements 3a, pixel electrodes 3b, and auxiliary capacitors 3e shown in FIG. 2 are formed, and gate lines GL and source lines SL are also formed on the transparent substrate 11. The other transparent substrate 12 is the so-called opposite substrate, referred to as such due to being disposed opposite to the transparent substrate 11. On the transparent substrate 12, a common electrode 3c shown in FIG. 2 and a color filter (not shown in drawings) are formed.

These two transparent substrates 11 and 12 are bonded together via a sealing material (not shown in drawings) and the liquid crystals 3d shown in FIG. 2 are sealed between the two transparent substrates 11 and 12. With this configuration, the liquid crystals 3d are sandwiched between the pixel electrode 3b and the common electrode 3c.

The two transparent substrates 11 and 12 have different external sizes to each other; the transparent substrate 11 has a larger external size than the transparent substrate 12. Therefore, even though the two transparent substrates 11 and 12 are bonded to each other, an outer edge 11a of the transparent substrate 11 is not in the same location as an outer edge 12a of the transparent substrate 12, exposing a part of the surface on the outer edge 11a side of the transparent substrate 11 (hereinafter referred to as a terminal surface 11b). The terminal surface 11b on the outer edge 11a side of the transparent substrate 11 is one region in the non-display region B, as show in FIG. 1, and is used in order to connect electrically the drivers 13 to the transparent substrate 11.

In other words, as shown in FIG. 3, a plurality of wiring lines 14, which are electrically connected to gate lines GL and source lines SL shown in FIG. 2, extend to the terminal surface 11b on the outer edge 11a side of the transparent substrate 11. Tips 14a of the plurality of wiring lines 14 are disposed in the vicinity of the outer edge 11a of the transparent substrate 11. However, the tips 14a of the plurality of wiring lines 14 do not reach the outer edge 11a of the transparent substrate 11. In addition, the tips 14a of the plurality of wiring lines 14 are arranged in a prescribed number of bundles (hereinafter referred to as a wiring line bundle), each including tips 14a of at least two (five in FIG. 3) wiring lines 14.

Film substrates 15 in which the drivers 13 are respectively installed are connected to the tips 14a of the plurality of wiring lines 14, and thus, the drivers 13 are connected electrically to the plurality of wiring lines 14. As shown in FIG. 1, a prescribed circuit board 16 is connected to the film substrates 15.

Figure 4:
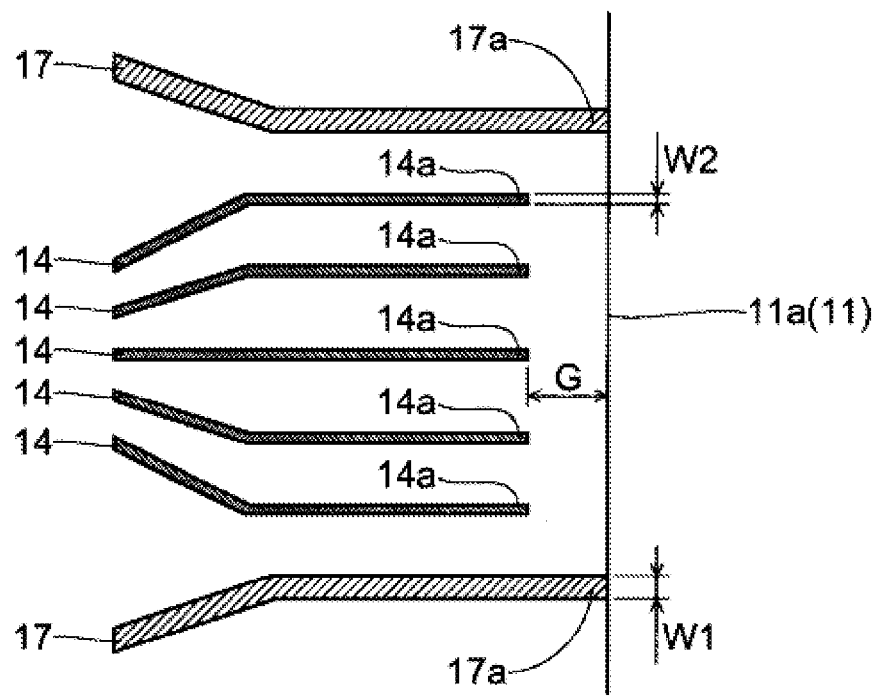
FIG. 4 is a plan view of a wiring structure according to Embodiment 1.

In Embodiment 1, the wiring lines 14, which transmit electrical signals to each pixel 3 (refer to FIGS. 1 and 2), and dummy wiring lines 17 that do not transmit electrical signals to each pixel 3 are formed on the terminal surface 11b on the outer edge 11a side of the transparent substrate 11, as shown in FIGS. 3 and 4. Additionally, static electricity absorbers (a diode ring, for example) 18 are connected to the dummy wiring lines 17. The dummy wiring lines 17 and the static electricity absorbers 18 are designed as a countermeasure against static electricity.

In the wiring structure in the terminal surface 11b on the outer edge 11a side of the transparent substrate 11, prescribed parts of the dummy wiring lines 17, which are a countermeasure against static electricity, are arranged so as to extend towards the outer edge 11a side of the transparent substrate 11. With this configuration, the prescribed parts of the dummy wiring lines 17 are closer to the outer edge 11a side of the transparent substrate 11 compared to where the wiring lines 14 are disposed. Specifically, the tips 17a of the dummy wiring lines 17 (parts on the opposite side to where the dummy wiring lines 17 are connected to the static electricity absorbers 18) extend further towards the outer edge 11a side of the transparent substrate 11 than the tips 14a of the wiring lines 14. Thus, the prescribed parts of the dummy wiring lines 17, or in other words, where the tips 17a of the dummy wiring lines 17 are disposed, are disposed closer to the outer edge 11a side of the transparent substrate 11 compared to the wiring lines 14.

The tips 17a of the dummy wiring lines 17, which are a countermeasure against static electricity, reach the outer edge 11a of the transparent substrate 11. In other words, while a gap G of a certain width is provided between the tips 14a of the wiring lines 14 and the outer edge 11a of the transparent substrate 11, no gap is provided between the tips 17a of the dummy wiring lines 17 and the outer edge 11a of the transparent substrate 11.

A width W1 of the dummy wiring lines 17, which are a countermeasure against static electricity, is greater than a width W2 of the wiring lines 14. As a result, the electrical resistance of the dummy wiring lines 17 is less than that of the wiring lines 14.

In addition, a plurality of dummy wiring lines 17, which are a countermeasure against static electricity, are provided, with each of a prescribed number of wiring line bundles (groups of tips 14a of at least two wiring lines 14) being provided with two dummy wiring lines 17. Each wiring line bundle is sandwiched between the tips 17a of the dummy wiring lines 17.

In Embodiment 1, by using the above-mentioned configuration, static electricity is more likely to be discharged to the tips 17a of the dummy wiring lines 17, and the static electricity is then absorbed by the static electricity absorber 18. As a result, a discharge of static electricity to the wiring lines 14, which are electrically connected to each pixel 3, can be avoided. Therefore, it is possible to mitigate the breakage of the switching element 3a and like included in each pixel 3 resulting from a discharge of static electricity. As a result, reliability and yield are improved.

In Embodiment 1, as stated above, by sandwiching the wiring line bundles (groups of tips 14a of at least two wiring lines 14) between the tips 17a of the dummy wiring lines 17, the discharge of static electricity to the wiring lines 14, which are electrically connected to the respective pixels 3, can be effectively avoided.

In Embodiment 1, the width W1 of the dummy wiring lines 17 is made to be greater than the width W2 of the wiring lines 14, thus giving the dummy wiring lines 17 a lower electrical resistance than the wiring lines 14. Therefore, the static electricity absorber 18 absorbs static electricity efficiently.

Figure 5:
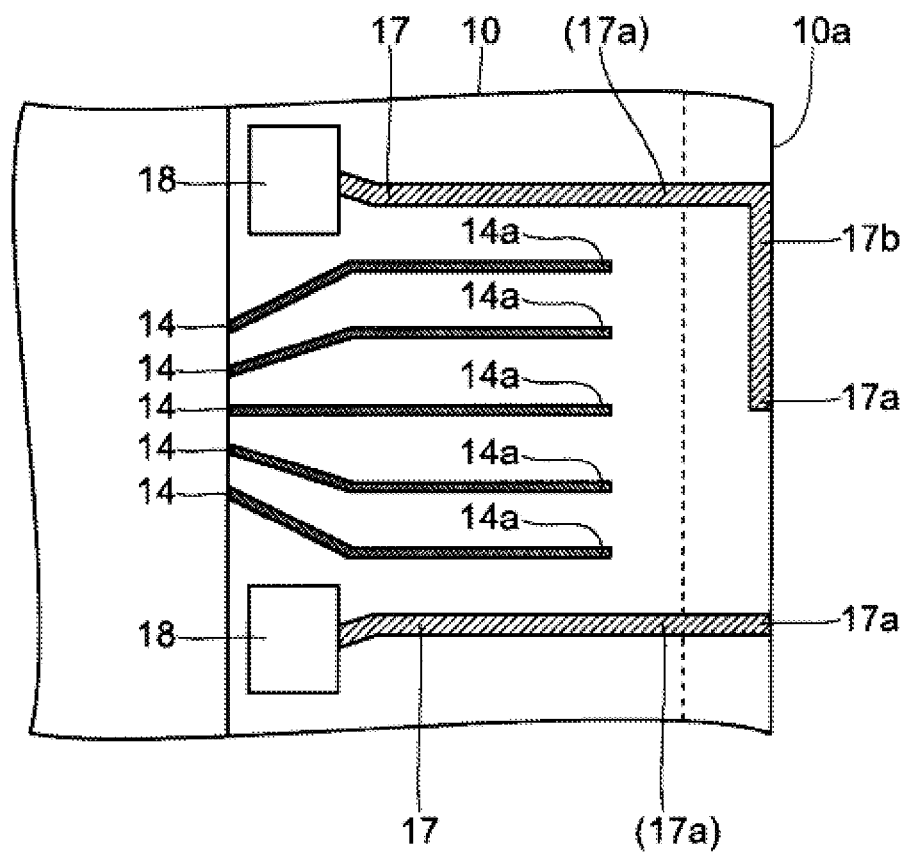
FIG. 5 is a plan view of a wiring structure according to Embodiment 1.

As shown in FIG. 5, while the liquid crystal display panel 1 (refer to FIG. 1) is obtained by dividing a large substrate 10 into individual areas along a division line (dotted line in FIG. 5), there is a possibility that static electricity can cause malfunctions before the large substrate 10 is divided. Therefore, it is preferable that when forming the dummy wiring lines 17, which are a countermeasure against static electricity, the tips 17a of the dummy wiring lines 17 be extended beyond the division line (dotted line in FIG. 5) and reach an outer edge 10a of the large substrate 10. As a result, it is possible to mitigate malfunctions resulting from static electricity occurring before the large substrate 10 is divided. The parts indicated with the "(17a)" in FIG. 5 correspond to the tips 17a of the dummy wiring lines 17 after the large substrate 10 is divided.

Not only may the tips 17a of the dummy wiring lines 17 reach the outer edge 10a of the large substrate 10, but the middle part 17b of the dummy wiring lines 17 may extend along the edge 10a of the large substrate 10. With this configuration, malfunctions resulting from static electricity before the large substrate 10 is divided can be mitigated to a greater extent.

Figure 6:
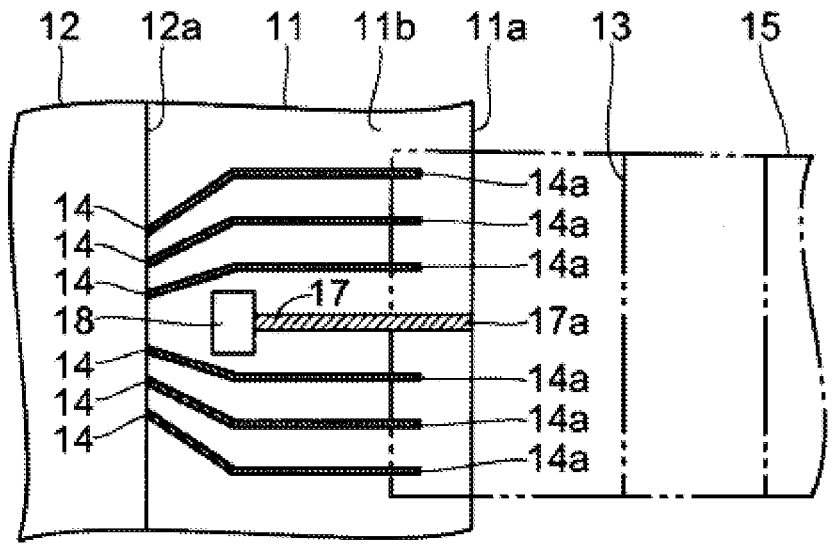
FIG. 6 is a plan view of a wiring structure according to a modified example of Embodiment 1.

As for a modified example of Embodiment 1, as shown in FIG. 6, a configuration may be used in which one dummy wiring line 17, which is a countermeasure against static electricity, is provided for each of a prescribed number of wiring line bundles (groups of tips 14a of at least two wiring lines 14) such that the tip 17a of the dummy wiring line 17 extends towards the outer edge 11a side of the transparent substrate 11 from inside the wiring line bundle. Effects similar to Embodiment 1 can be attained with this modified example.

Figure 7:
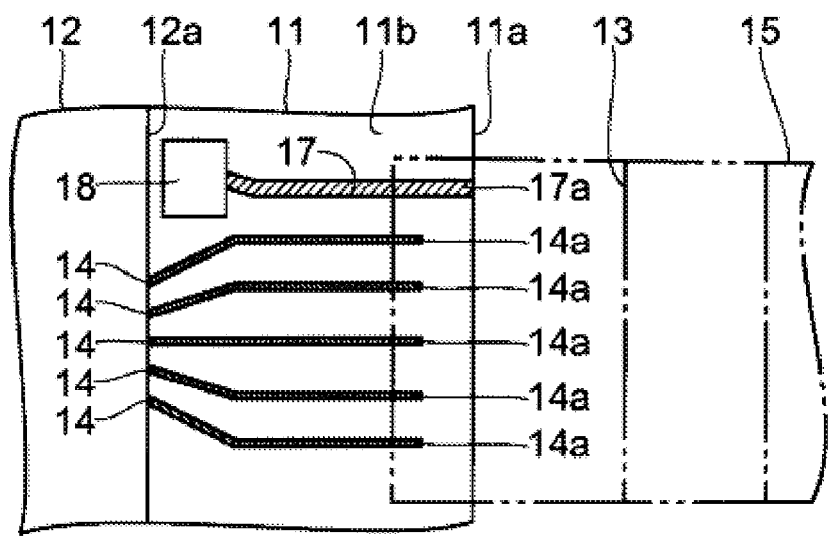
FIG. 7 is a plan view of a wiring structure according to a modified example of Embodiment 1.

Also, as shown in FIG. 7, one dummy wiring line 17, which is a countermeasure against static electricity, may be provided for each of a prescribed number of wiring line bundles (groups of tips 14a of at least two wiring lines 14) such that the tip 17a of the dummy wiring line 17 is disposed on one side of the wiring line bundle.

(Embodiment 2)

Figure 8:
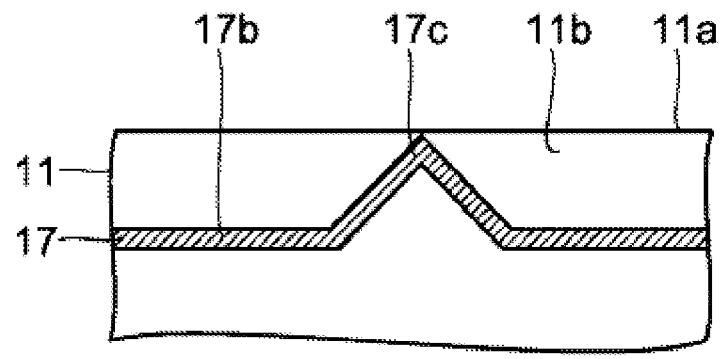
FIG. 8 is a plan view of a wiring structure according to Embodiment 2.

In Embodiment 2, as shown in FIG. 8, a middle part 17b of a dummy wiring line 17, which is a countermeasure against static electricity, extends along an outer edge 11a of a transparent substrate 11, and the middle part 17b of the dummy wiring line 17 is disposed so as to be closer to the outer edge 11a side of the transparent substrate 11 compared to other wiring lines (corresponding to wiring lines 14 in Embodiment 1). A part 17c of the middle part 17b of the dummy wiring line 17 juts out (in a substantially triangular shape) towards the outer edge 11a side of the transparent substrate 11. The part 17c of the middle part 17b of the dummy wiring line 17 is not limited to a particular shape, and may have a different shape from that shown in FIG. 8.

In Embodiment 2, by using a configuration such as that mentioned above, discharges of static electricity are more likely to occur in the middle part 17b of the dummy wiring line 17, and thus, effects similar to Embodiment 1 can be attained.

Figure 9:
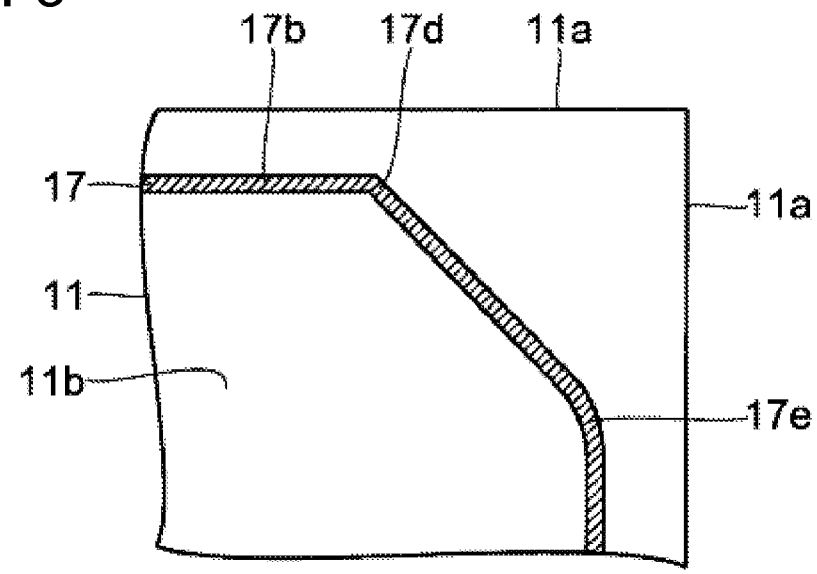
FIG. 9 is a plan view of a wiring structure according to a modified example of Embodiment 2.

In a modified example of Embodiment 2, as shown in FIG. 9, a part 17d of the middle part 17b of the dummy wiring line 17 may be bent at an angle, or a part 17e of the middle part 17b of the dummy wiring line 17 may be bent so as to form a curve, in the vicinity of a corner part of the transparent substrate 11. It is apparent that a different shape from that shown in FIG. 9 may be used.

The configuration of Embodiment 2 may also be combined with the configuration of Embodiment 1.

(Embodiment 3)

Figure 10:
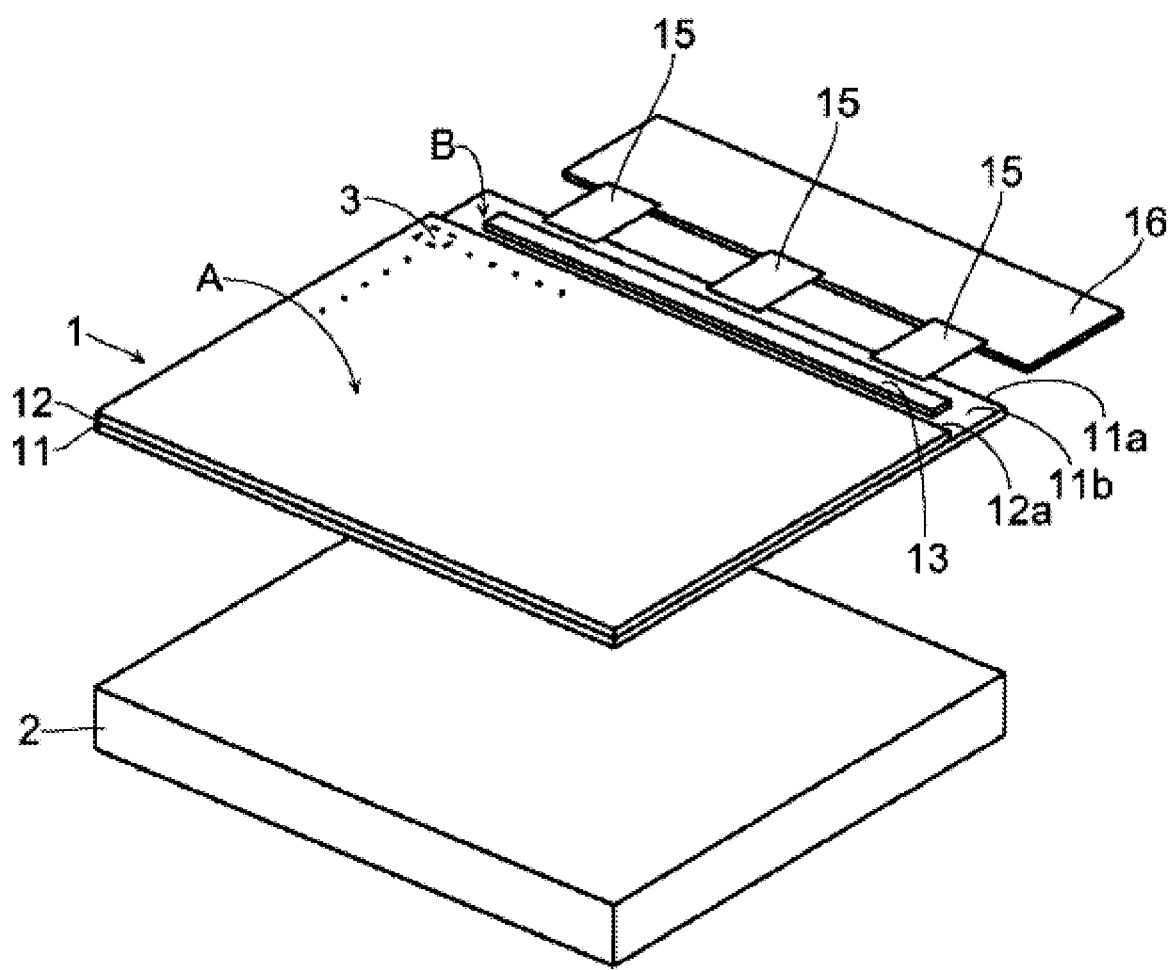
FIG. 10 is an exploded perspective view of a liquid crystal display device (display device) provided with a wiring structure according to Embodiment 3.
Figure 11:
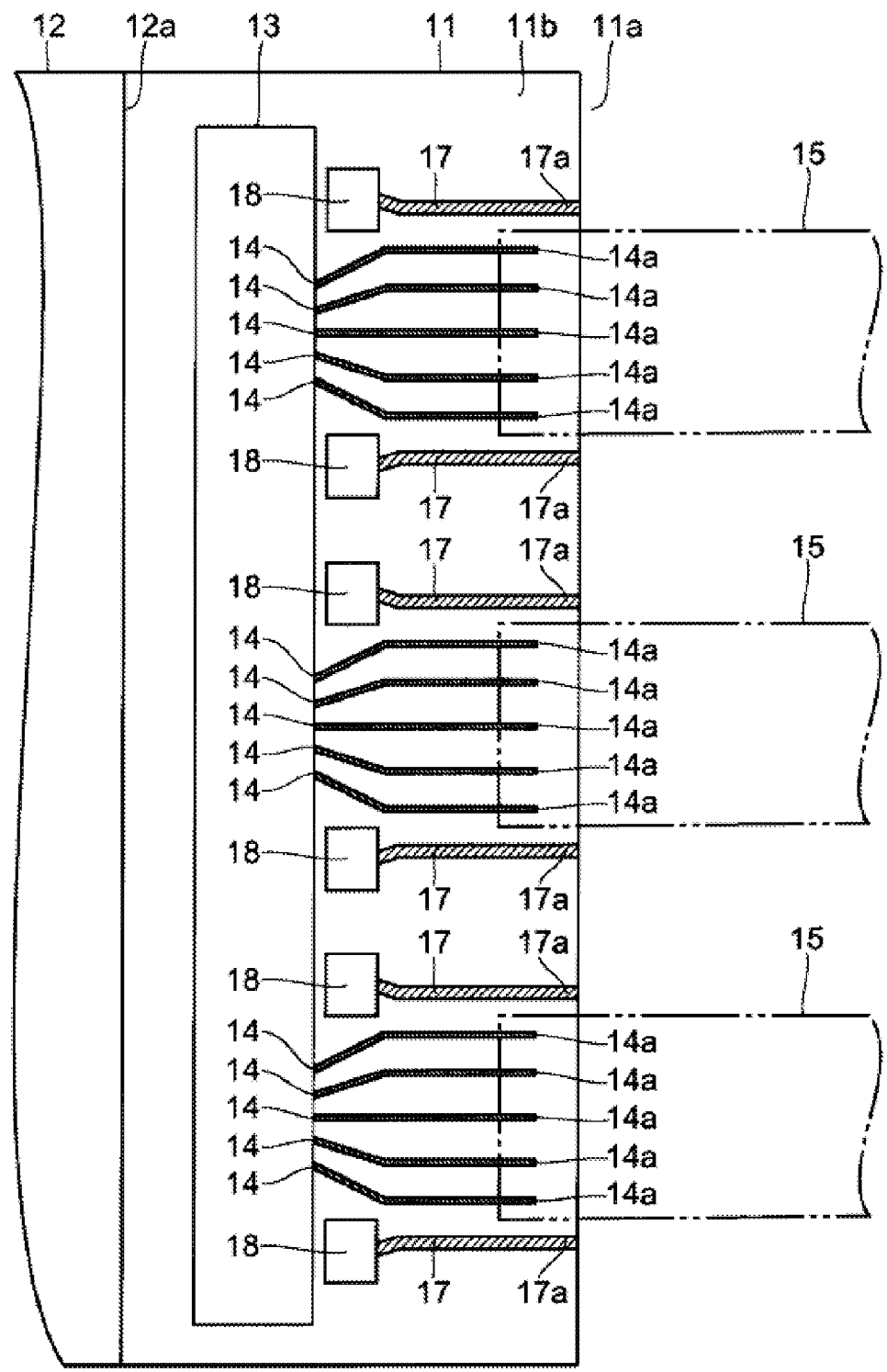
FIG. 11 is a plan view of a wiring structure according to Embodiment 3.

A case in which a wiring structure of the present invention is applied to a small liquid crystal display device will be described below with reference to FIGS. 10 and 11.

In Embodiment 3, a driver 13 is installed on a terminal surface 11b on an outer edge 11a side of a transparent substrate 11, and not on a film substrate 15. The parts of wiring lines 14 on the opposite side to tips 14a are connected to the driver 13. Dummy wiring lines 17, which are a countermeasure against static electricity, are formed on the terminal surface 11b on the outer edge 11a side of the transparent substrate 11, and the dummy wiring lines 17 are drawn out so as to avoid the driver 13 and connected to static electricity absorbers 18. Specifically, when viewed from the mounting region of the driver 13, the dummy wiring lines 17 are not drawn out in a region closer to an outer edge 12a of a transparent substrate 12. The dummy wiring lines 17 are only drawn out in a region closer to the outer edge 11a of the transparent substrate 11.

In a case in which the driver 13 is installed onto the terminal surface 11b on the outer edge 11a side of the transparent substrate 11, the driver 13 also corresponds to the "circuit element" of the present invention.

Another configuration for Embodiment 3 is a configuration similar to that of Embodiment 1. In other words, the tips 17a of the dummy wiring lines 17 extend further towards the outer edge 11a side of the transparent substrate 11 compared to the tips 14a of the wiring lines 14, and reach the outer edge 11a of the transparent substrate 11. In order to reduce the electrical resistance of the dummy wiring lines 17, the width thereof is made to be greater than that of the wiring lines 14. In addition, wiring line bundles (groups of tips 14a of at least two wiring lines 14) are sandwiched between the tips 17a of the dummy wiring lines 17.

By using the above-mentioned configuration in Embodiment 3, effects similar to that of Embodiment 1 can be attained.

In addition, in Embodiment 3, the driver 13 is installed onto the terminal surface 11b on the outer edge 11a side of the transparent substrate 11, and breakage of the driver 13 due to static electricity can also be mitigated.

Figure 12:
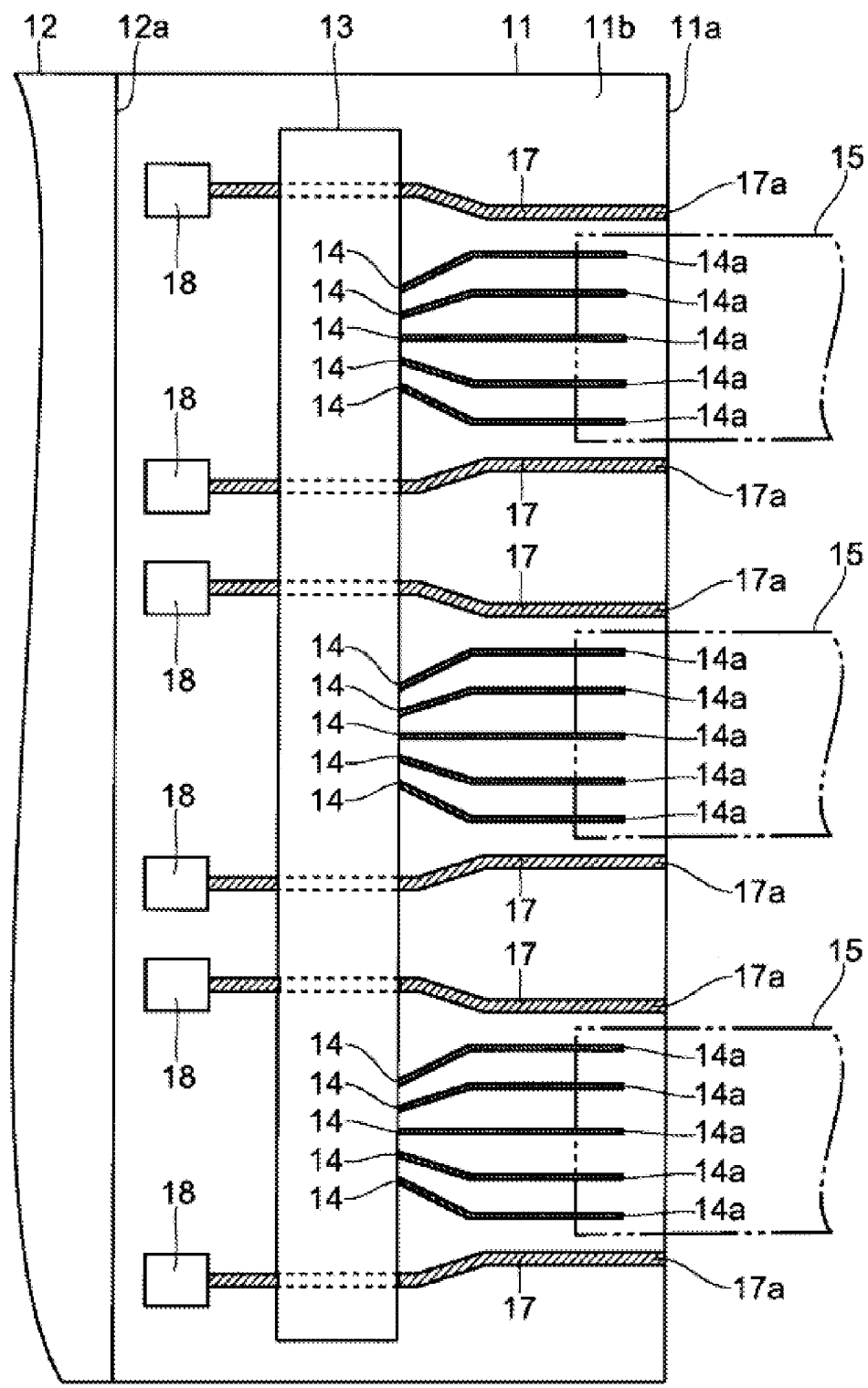
FIG. 12 is a plan view of a wiring structure according to a modified example of Embodiment 3.
Figure 13:
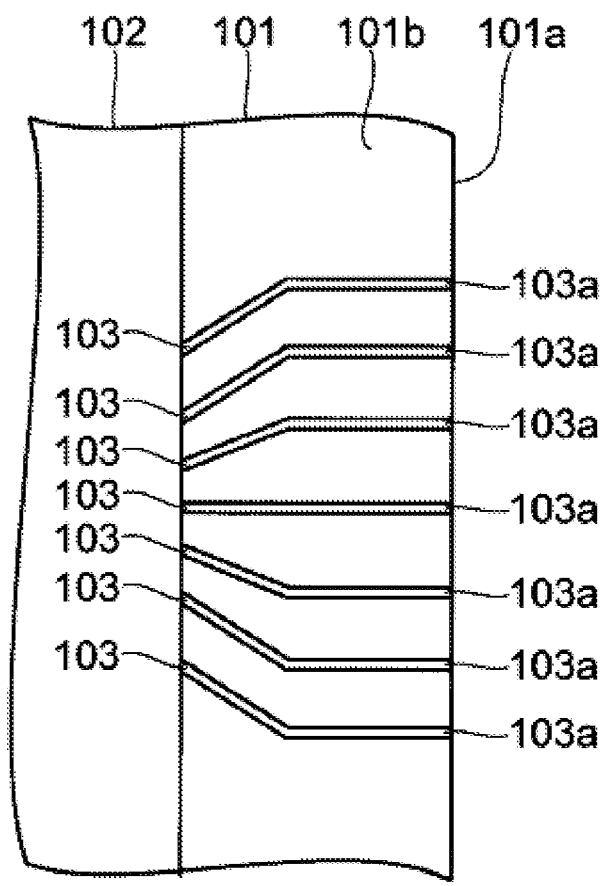
FIG. 13 is a drawing for describing a problem of a conventional device.

In a modified example of Embodiment 3, as shown in FIG. 12, when viewed from the mounting region of the driver 13, the dummy wiring lines 17 may be drawn out so as to extend across to the region closer to the outer edge 12a of the transparent substrate 12 from the region closer to the outer edge 11a of the transparent substrate 11, and the dummy wiring lines 17 may be connected to the static electricity absorber 18 in the region closer to the outer edge 12a of the transparent substrate 12. In this case, the dummy wiring lines 17 may be guided under the driver 13.

The embodiments disclosed herein are examples in every respect, and not limiting. The scope of the present invention is defined by the claims and not the description of the above-mentioned embodiments. Furthermore, all changes are possible within an equivalent meaning and scope of the claims.

For example, in the above-mentioned embodiments, an example was described in which a wiring structure of the present invention is applied to a liquid crystal display device, but the wiring structure of the present invention may be applied to a display device other than a liquid crystal display device. It is apparent that the present invention may be applied to a device other than a display device.

DESCRIPTION OF REFERENCE CHARACTERS 1 liquid crystal display panel (display panel)
10 substrate
10a outer edge
11 transparent substrate (substrate)
11a outer edge
14 wiring line
14a tip
17 dummy wiring line
17a tip
17b middle part
18 static electricity absorber

The invention claimed is:
1. A wiring structure, comprising:
a substrate on which a circuit element is installed;
wiring lines that are formed on the substrate and transmit electric signals to the circuit element; and
dummy wiring lines for countermeasures against static electricity that are formed on the substrate and that are not connected to the wiring lines, the dummy wiring lines being connected to static electricity absorbers,
wherein locations where prescribed parts of the dummy wiring lines are disposed are closer to an outer edge side of the substrate than locations where the wiring lines are disposed, and the prescribed parts of the dummy wiring lines are formed in a shape that extends towards the outer edge side of the substrate.
2. The wiring structure according to claim 1, wherein a width of the dummy wiring lines is greater than a width of the wiring lines.

3. The wiring structure according to claim 1,
wherein tips of the dummy wiring lines and tips of the wiring lines are disposed in a region on the outer edge side of the substrate, and
wherein the tips of the dummy wiring lines extend further towards the outer edge side of the substrate compared to the tips of the wiring lines.

4. The wiring structure according to claim 3, wherein the tips of the dummy wiring lines reach the outer edge of the substrate.

5. The wiring structure according to claim 3,
wherein the wiring lines include a plurality of wiring lines, and the tips of the plurality of wiring lines form a bundle, and
wherein the tips of the dummy wiring lines extend further towards the outer edge side of the substrate than the bundle of the tips of the plurality of wiring lines.

6. The wiring structure according to claim 5, wherein the bundle of the tips of the plurality of wiring lines are sandwiched between the tips of the dummy wiring lines.

7. The wiring structure according to claim 5, wherein the tip of the dummy wiring line extends towards the outer edge side of the substrate from the inside of the bundle of the tips of the plurality of wiring lines.

8. The wiring structure according to claim 1, wherein a middle part of the dummy wiring line extends along the outer edge of the substrate.

9. The wiring structure according to claim 8, wherein a part of the middle part of the dummy wiring line juts out towards the outer edge side of the substrate.

10. A display panel, comprising the wiring structure according to claim 1.

11. A display device, comprising the display panel according to claim 10.

* * * * *